(12) United States Patent
Tollet

(10) Patent No.: US 10,616,071 B2
(45) Date of Patent: Apr. 7, 2020

(54) ASYNCHRONOUS ANALYSIS OF A DATA STREAM

(71) Applicant: QOSMOS TECH, Paris (FR)

(72) Inventor: Jérôme Tollet, Paris (FR)

(73) Assignee: QOSMOS TECH, Paris (FR)

( * ) Notice: Subject to any disclaimer, the term of this patent is extended or adjusted under 35 U.S.C. 154(b) by 0 days.

(21) Appl. No.: 15/775,027

(22) PCT Filed: Nov. 4, 2016

(86) PCT No.: PCT/FR2016/052858
§ 371 (c)(1),
(2) Date: May 10, 2018

(87) PCT Pub. No.: WO2017/081389
PCT Pub. Date: May 18, 2017

(65) Prior Publication Data
US 2019/0075028 A1    Mar. 7, 2019

(30) Foreign Application Priority Data
Nov. 12, 2015   (FR) ...................................... 15 60784

(51) Int. Cl.
*H04L 12/24*   (2006.01)
*H04L 12/26*   (2006.01)
*H04L 29/08*   (2006.01)

(52) U.S. Cl.
CPC .......... *H04L 41/14* (2013.01); *H04L 41/5019* (2013.01); *H04L 43/028* (2013.01);
(Continued)

(58) Field of Classification Search
CPC . H04L 41/0893; H04L 41/14; H04L 41/5019; H04L 43/028; H04L 43/04;
(Continued)

(56) References Cited

U.S. PATENT DOCUMENTS

| 7,454,499 B2 | 11/2008 | Cantrell et al. |
| 7,496,662 B1 | 2/2009 | Roesch et al. |

(Continued)

FOREIGN PATENT DOCUMENTS

| EP | 1 722 509 A1 | 11/2006 |
| WO | WO 2013/121141 A1 | 8/2013 |
| WO | WO 2014/108173 A1 | 7/2014 |

OTHER PUBLICATIONS

European Examination Report dated Jul. 11, 2019 for Application No. EP 16809962.0, 7 pgs.
(Continued)

*Primary Examiner* — Phuc H Tran
(74) *Attorney, Agent, or Firm* — Frost Brown Todd LLC

(57) ABSTRACT

The invention relates to a method for processing a data stream exchanged between a client and an entity via a telecommunications network, the data stream including a set of data packets, the processing method including the following steps: upon intercepting (201) a data packet belonging to a data stream—the data stream including a source and a recipient, the client being the source or the recipient of the data stream—copying (204) the data packet and transferring (205) the data packet to the recipient; transmitting said copy to a stream analyser capable of analyzing the data stream; receiving (206) a data stream analysis result from the stream analyser; and processing (207; 208) the data stream in accordance with the receiver analysis result.

7 Claims, 3 Drawing Sheets

(52) U.S. Cl.
CPC .......... *H04L 43/04* (2013.01); *H04L 67/1095* (2013.01); *H04L 41/0893* (2013.01)

(58) Field of Classification Search
CPC ..... H04L 67/1095; H04L 12/66; H04L 47/10; H04L 47/20; H04L 63/0281; H04L 63/1416; H04L 63/1425; H04L 63/20; H04L 67/10; H04L 67/146; H04L 67/2814
See application file for complete search history.

(56) References Cited

U.S. PATENT DOCUMENTS

| | | | |
|---|---|---|---|
| 7,835,361 | B1 | 11/2010 | Dubrovsky et al. |
| 8,166,547 | B2 | 4/2012 | Bevan et al. |
| 9,148,352 | B2 * | 9/2015 | Manula .................. H04L 43/04 |
| 2014/0177633 | A1 * | 6/2014 | Manula ................ H04L 43/028 |
| | | | 370/392 |

OTHER PUBLICATIONS

International Search Report and Written Opinion dated Feb. 28, 2017 for Application No. PCT/FR2016/052858, 20 pgs.

* cited by examiner

ASYNCHRONOUS ANALYSIS OF A DATA STREAM

TECHNICAL FIELD

The present invention relates to the processing of data in telecommunications networks, and especially to the analysis of streams traveling to/from a client.

It relates more precisely to data stream monitoring and filtering applications, for example for Internet streams.

Hereinafter, by data stream is meant any set of data exchanged between a client and an entity, that is to say between a client and a server, or between two clients (so-called peer-to-peer, or P2P, streams), for example on a network of Internet type.

BACKGROUND ART

It is known to apply various data stream classification schemes to detect a data format, or a protocol employed for their transport, the aim being to filter the data streams, to categorize a stream so as to enable a quality of service QoS to be set up in the network, or more generally to process a data stream.

For this purpose, stream analyzers can be arranged interception-wise in network access points, such as Wi-fi stations for example, situated in public places such as a hospital or a university campus for example. Indeed, in a hospital or in a university campus, it may be desirable to prevent P2P data streams, and it is thus necessary to detect such data streams.

Such data stream analyzers intercept packets of the data stream and the packets are processed so as to undertake the classification of the stream.

Statistical algorithms and deterministic algorithms (also called DPI, for "Deep Packet Inspection") are well known and make it possible, on the basis of the data packets intercepted, to determine the format of the data exchanged or the protocol used for their transport, or more generally to place the data stream into a category, so as to deduce whether or not the data stream is an authorized stream as a function of the category assigned to it or whether a specific QoS should be applied in respect of this stream.

SUMMARY OF INVENTION

Technical Problem

However, the analysis of the packets of a data stream introduces a lag when the stream analyzer is in interception in the telecommunications network: each packet received by the analyzer is processed and retained during the processing applied by the analyzer.

The analysis of a packet may make it possible to categorize the stream corresponding to the processed packet. In this case, the packet is retained if the stream is prohibited, is transferred if the stream is authorized, or a QoS policy is applied to the stream corresponding to the packet. In the case where the analysis of the packet is not sufficient to categorize the stream, the packet is transferred on completion of the analysis.

Thus, each data packet is retained during its analysis, thereby introducing latency into the network. Moreover, the analysis durations being variable (from a few milliseconds to a few tenths of a second), the latency is in no way guaranteed for the client, this not being satisfactory.

Thus, a need exists to analyze the data streams of a client effectively while guaranteeing the client minimum latency. The present invention improves the situation.

Solution to Problem

It proposes for this purpose a method for processing a data stream exchanged between a client and an entity via a telecommunications network, the data stream comprising a set of data packets, the processing method comprising the following steps:

on interception of a data packet belonging to a data stream, the data stream comprising a source and a recipient, the client being the source or the recipient of the data stream, copying the data packet or generating a reference to the data packet, and transferring the data packet to the recipient;

transmitting said copy or reference to a stream analyzer able to analyze the data stream;

receiving a result of analysis of the data stream from the stream analyzer;

processing the data stream on the basis of the analysis result received.

By entity is meant any entity able to exchange data streams with the client: it may for example be another client or a server.

By analysis result is meant any classification of the data stream into a given category, or any deduction of a characteristic of the data stream. This result may be obtained by the analysis of a single packet of the stream, or may alternatively require the analysis of several packets of the stream. The processing of the stream may be based on a set of rules taking an analysis result as input and indicating the processing associated with this analysis result.

In the case where the stream analyzer and the entity implementing the method according to the invention share the same memory space, a reference to the data packet (such as a storage address for the packet in memory) suffices for the stream analyzer to analyze the packet. In this case, the packet is on the one hand transferred to the recipient and on the other hand stored in memory until the stream analyzer, and the entity implementing the method, have finished their respective processings of the packet, the order of completion of these processings being of little importance. Thus, the packet may possibly have already been transmitted to the recipient but nonetheless be preserved in memory since its processing by the stream analyzer has not been completed. The generation of a reference thus makes it possible, in the case where the stream analyzer and the entity implementing the method according to the invention share the same memory space, to avoid copying the data packet needlessly. The needless consumption of software resources required for copying a data packet is thus avoided.

Furthermore, basing the analysis of the stream on copies of data packets, or on references to data packets, advantageously makes it possible to reduce the latency associated with the analysis of the stream since the data packets need not be retained while each packet is being analyzed. The obverse, in the case where the processing consists in authorizing or prohibiting a stream, is that data packets potentially belonging to a prohibited stream are transmitted to the recipient, but, in practice, allowing a few data packets of a prohibited stream to pass is not damaging, especially in the context where it is sought to prohibit certain types of stream (such as P2P streams for example). In the case where the processing consists in applying a quality-of-service policy depending on the analysis result, the obverse is that the quality-of-service policy is implemented only once the analysis result has been received. However, this prevents only—in the most pessimistic scenario—the quality of service from being applied on the first packets corresponding to a video conference for example, this not being damaging for the user.

The method can furthermore comprise a time delay step of a predetermined duration D subsequent to the copying of the data packet or to the generating of the reference, and the data packet can be transferred to the recipient on expiry of the time delay, only:

if the stream analysis result has been received from the stream analyzer and the data stream is authorized; or if the stream analysis result has not yet been received from the stream analyzer.

Thus, it is made possible to limit the risk of transferring a data packet of a prohibited stream or to avoid transferring a packet to which a given quality-of-service policy ought to be applied, while ensuring a guaranteed maximum latency, this being advantageous in the context of data streams such as Internet streams.

As a variant, after having been copied or after having generated a reference, the data packet can be transferred instantaneously to the recipient.

When a reference is transferred to the stream analyzer, and when the data packet is transferred to the recipient, the data packet is furthermore stored in a memory of the entity implementing the method. This memory is made available to the stream analyzer which accesses the packet by means of the reference received.

The filtering method is thus transparent in terms of latency according to this embodiment.

In one embodiment, processing the data stream can comprise:

applying a quality-of-service policy depending on the analysis result received; or authorizing or prohibiting the data stream on the basis of the analysis result received.

Other processings can of course be considered, the application of a quality-of-service policy and the filtering (authorization or prohibition) of a stream being given merely by way of illustration.

Additionally, the predetermined duration D can be determined in a statistical manner in such a way that, for a set N of data streams, at least one predetermined fraction k of the N data streams is analyzable by the stream analyzer in an analysis duration of less than D.

The duration D is thus optimized to ensure a compromise between a low latency and a low risk of transferring data packets of prohibited streams or of transferring data packets to which a quality-of-service policy ought to have been applied.

According to one embodiment of the invention, the step of processing the data stream on the basis of the analysis received can comprise the following steps:

storing in a database a marking of the data stream, the marking indicating whether the stream is authorized or prohibited.

The method can comprise furthermore, on each interception of a data packet:

identifying the data stream corresponding to the packet received;

transferring the data packet to the recipient if the data packet corresponds to an authorized stream;

blocking the data packet if the data packet corresponds to a prohibited stream.

A second aspect of the invention relates to a computer program product comprising instructions for the implementation of the method according to the first aspect of the invention, when this program is executed by a processor.

A third aspect of the invention relates to a device for processing a data stream exchanged between a client and an entity via a telecommunications network, the data stream comprising a set of data packets, the processing device comprising:

an input interface for intercepting a data packet belonging to a data stream;

an output interface;

a processor configured to, on interception of a data packet belonging to a data stream, the data stream comprising a source and a recipient, the client being the source or the recipient of the data stream, copy the data packet or generate a reference to the data packet, and to transfer the data packet to the recipient via the output interface.

The output interface can furthermore be designed to transmit the copy to a stream analyzer able to analyze the data stream, the input interface can furthermore be designed to receive a result of analysis of the data stream from the stream analyzer and the processor can furthermore be designed to process the data stream on the basis of the analysis result received.

The processor can furthermore be able to time delay for a predetermined duration D subsequent to the copying of the data packet or to the generating of the reference, and to transfer the data packet to the recipient on expiry of the time delay, only:

if the stream analysis result has been received from the stream analyzer and the data stream is authorized; or if the stream analysis result has not yet been received from the stream analyzer.

A fourth aspect of the invention relates to a data stream processing system comprising a processing device according to the third aspect of the invention and a stream analyzer able to, on the basis of one or more data packets of a data stream, obtain a result of analysis of the data stream.

BRIEF DESCRIPTION OF DRAWINGS

Other characteristics and advantages of the invention will become apparent on examining the description detailed hereinafter, and the appended drawings in which.

DESCRIPTION OF EMBODIMENTS

Figure 1:
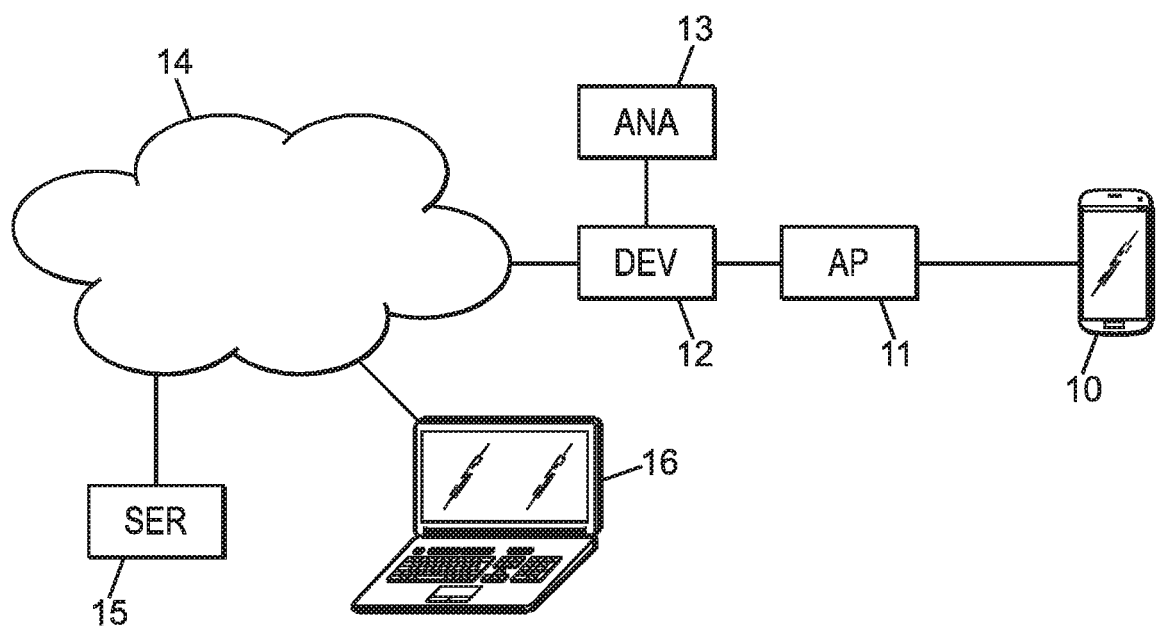
FIG. 1 illustrates a general architecture of a system according to one embodiment of the invention.

FIG. 1 illustrates a system according to one embodiment of the invention.

The system comprises a user terminal 10, called "client" hereinafter, such as a laptop or desktop computer, a touch tablet, a Smartphone or else any electronic device comprising an interface making it possible to communicate with an access point 11 of a telecommunications network 14, such as the Internet network for example.

No restriction is attached to the access point 11 which may be a wireless access point, of Wi-fi type for example, or a wired link (ADSL or fiber for example).

For example, in what follows, the access point 11 is considered to be a Wi-fi station of a university campus. As discussed in the introduction, one may desire the prohibition of P2P data streams for users accessing an Internet network via an access point of a university campus.

Via the telecommunications network 14, the client 10 can communicate with a remote server 15 so as to request multimedia contents, for example, or more simply to request the loading of an Internet page, or else to exchange files (by uplink and/or by downlink) with another client 16 via a peer-to-peer communication protocol. The invention also provides that the client 10 can upload a multimedia content on the server 15.

The way in which the communication is established, the requests and responses are routed, is well known per se and is not presented in greater detail in what follows.

When the communication is established between the client 10 and the server 15 or the client 16, a data stream is exchanged via the telecommunications network 14. This data stream can implement an exchange of data packets, such as TCP ("Transport Control Protocol") packets for example, when this transport protocol is employed. However, no restriction is attached to the layer of protocols that is employed for the communication of the data stream.

Such a data stream may be observed and intercepted by a processing device 12 according to one embodiment of the invention, which may be situated upstream or downstream of the access point 11, or which may be integrated into the access point 11. For example, the university campus of the example considered hereinabove may be equipped with a single processing device 12.

The processing device 12 may be linked to a stream analyzer 13 in charge of analyzing the packets of a data stream with a view to categorizing this data stream. As a variant, the stream analyzer 13 may be integrated into the processing device 12. The stream analyzer 13 and the processing device 12 may, according to certain embodiments, share one same memory.

Such a stream analyzer 13 is well known per se and is outside the scope of the invention. It will be possible for example to refer to the traffic analysis system of the patent application published under the number EP1722509.

In any event, the stream analyzer 12 is able to return an analysis result to the processing device 12 which can be utilized to process the data stream. For example, the analysis result may allow a categorization of the data stream, for example, between a group of P2P data streams, and a group of non-P2P data streams. Thus, in the case where the processing device 12 is dedicated to filtering, it may prohibit the streams categorized as being P2P and authorize the streams categorized as being non-P2P. As a variant, the categorization of the streams may be used by the processing unit 12 to apply differentiated QoS policies.

Figure 2:
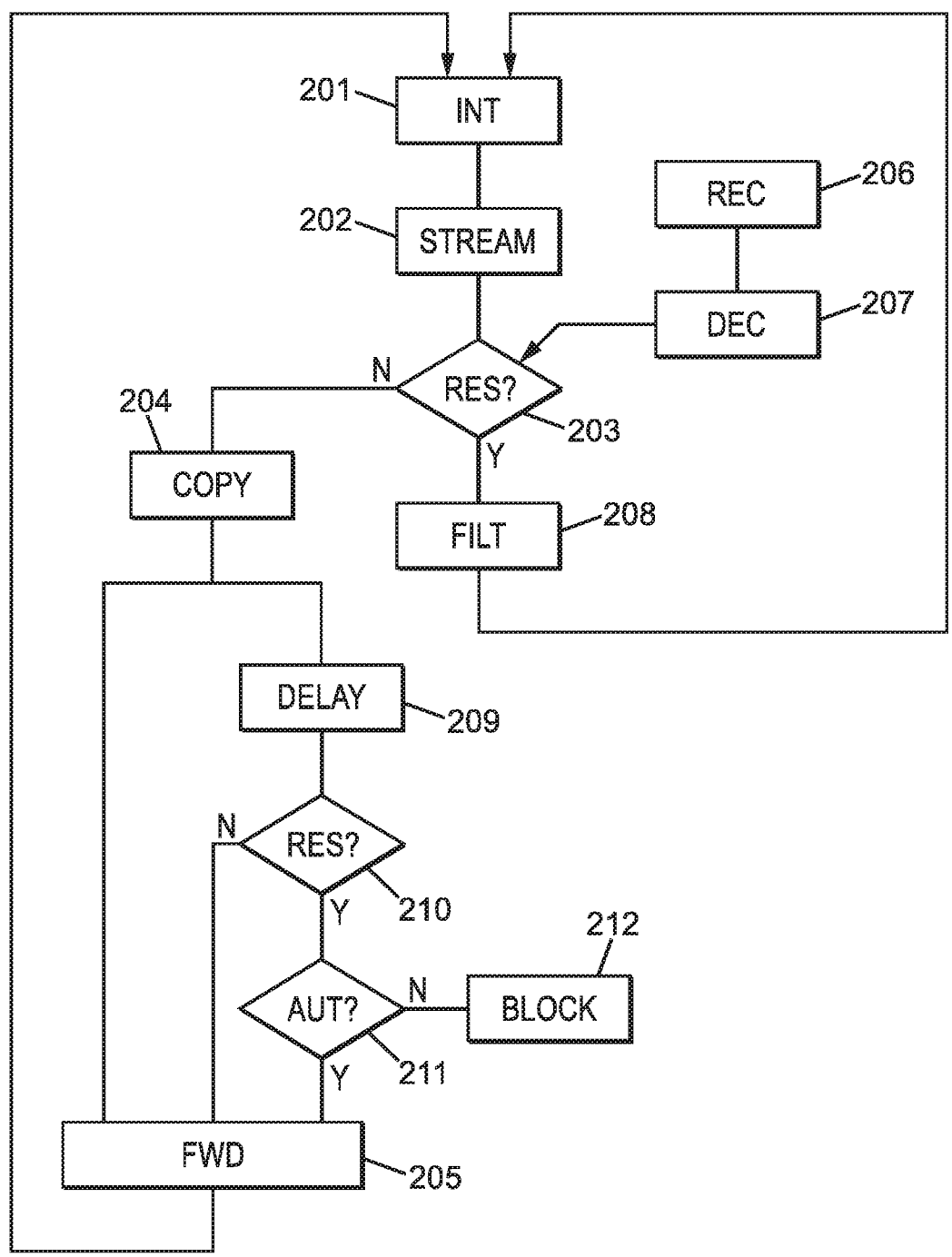
FIG. 2 is a chart presenting the steps of a processing method according to one embodiment of the invention.

FIG. 2 is a chart illustrating the steps of a method for processing a data stream according to one embodiment of the invention. The stream processing method can be implemented by the processing device 12 represented in FIG. 1.

In what follows, the example of data stream filtering is considered, in an illustrative manner. The data streams can then be authorized or prohibited by the processing device 12. However, as detailed hereinabove, the invention also applies to the application of QoS policies to data streams, and more generally to any data stream processing.

In a step 201, a data packet is intercepted by the analysis device 12. As explained previously, the data packet can be sent from the client 10 or can be intended for the client 10.

In a step 202, a data stream to which the data packet corresponds is identified. No restriction is attached to the way of identifying a stream. A stream identifier may for example comprise an identifier of the source and an identifier of the recipient. The client 10 is either the source or the recipient of the identified stream.

In a step 203, it is verified whether the identified stream has been previously categorized in the processing device 12 as authorized stream or prohibited stream.

If no categorization of the stream has previously been performed, the data packet is copied in a step 204. A copy of the data packet is thus obtained and is transmitted to the stream analyzer 13. As a variant, in the case where the stream analyzer 13 and the processing device 12 share a common memory, step 204 consists in generating a reference to the data packet.

The data packet is thereafter transmitted in a step 205 to the recipient of the stream (the client 10 when it is recipient, the server 15 or the client 16 when the client 10 is the source). In the case where a reference is generated instead of a copy of the data packet, the data packet is furthermore stored in memory until the completion of step 206 detailed hereinafter.

No restriction is attached to the order in which the data packet and its copy (or its reference) are transferred, and the arrangement of the steps of FIG. 2 is given by way of illustration.

By basing the analysis of the stream on copies of data packets or on references it is made possible to reduce the latency associated with the analysis of the stream since the data packets need not be retained in the processing unit 12 until the packet is analyzed. The obverse is that data packets potentially belonging to a prohibited stream are transmitted to the recipient. However, in practice, allowing a few data packets of a prohibited stream to pass is not damaging, especially in the context where it is sought to prohibit certain types of stream (such as P2P streams for example).

In a step 206, when one or more copies or references of data packets corresponding to a data stream have been transferred to the stream analyzer 13, a result of the analysis is received from the stream analyzer 13 in a step 206. The duration required to obtain such a result may not be known in advance and varies according to the data stream to be analyzed. The duration of analysis of a data stream may be represented, as in FIG. 3, by the curve 301.

An index of a data stream is represented as abscissa and the duration of analysis of this data stream is represented as ordinate. The curve 301 is obtained after analysis of a number N of data streams, N being of the order of magnitude of several hundred or several thousand. The indices of the data streams are ranked in such a way that the analysis durations are decreasing. In practice, the curve 301 obtained is of hyperbolic shape, that is to say that only a relatively small number of data streams require lengthy analysis.

In a step 207, on receipt of a result of analysis from the stream analyzer 13, the processing unit 12 can categorize the data stream with a view to authorizing or prohibiting the data stream. The result of this categorization can be utilized in step 203 on receipt of a new data packet corresponding to the same data stream.

The processing unit 12 can store a set of rules taking the analysis result as input and returning a categorization of the stream, either an authorized stream or a prohibited stream. In the particular example described hereinabove, the analysis result can indicate whether the data stream is a P2P stream, and only P2P streams are categorized as streams that are prohibited by the processing unit 12. The categorization of the data stream (or marking of the data stream) can be stored in association with an identifier of the data stream in a database of the processing unit 12. As explained previously, the identifier of the data stream can comprise an identifier of the recipient (IP address, or port number/IP address pair for example) and an identifier of the source.

Thus, when it is determined in step 203 that the data stream corresponding to the data packet received has been categorized, the method comprises the filtering in a step 208 of the data packet on the basis of the category assigned to the data stream which corresponds to it:
- if the data stream is authorized, for example if the data stream is established between the client 10 of the university campus and the server 15 (non-P2P stream), the data packet is transferred directly to the recipient;
- if the data stream is prohibited, for example if the data stream is established between the client 10 of the university campus and the other client 16 (P2P stream), the data packet is blocked.

As explained previously, the data packet is transferred in a step 205 to the recipient after having been copied in step 204 (or after having generated a reference). According to a first embodiment, the data packet is transferred immediately in step 205 after having been copied or after having generated a reference (left branch on output from the block 204).

According to a second embodiment, it may be time delayed in a step 209 for a predetermined duration D after having copied the data packet, or after having generated a reference, in step 204 (right branch on output from the block 204). On completion of the duration D, it is determined if an analysis result has been received, in a step 210. If such is not the case, the data packet is transferred in step 205 to the recipient of the data stream.

If it is determined that the analysis result has been received in step 210, it is verified in a step 211 whether the data stream is categorized as an authorized stream. If such is the case, the data packet is transferred in step 205. Conversely, if the data stream is prohibited, the data packet is blocked in a step 212.

Thus, according to the second embodiment, all the data packets are delayed by a duration D as long as an analysis result has not been received.

Figure 3:
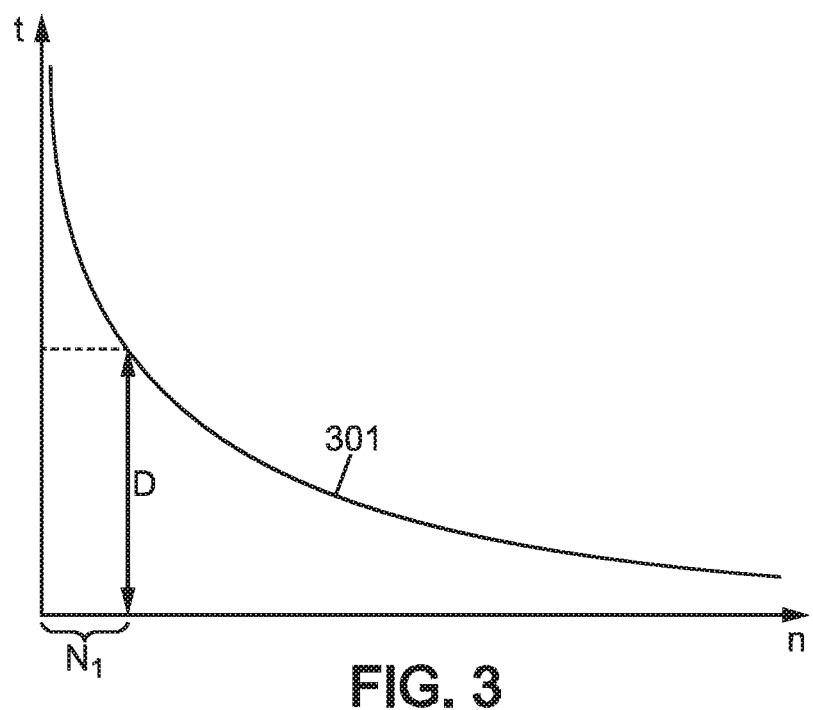
FIG. 3 is a curve illustrating the durations of analysis of various data streams.
Figure 4:
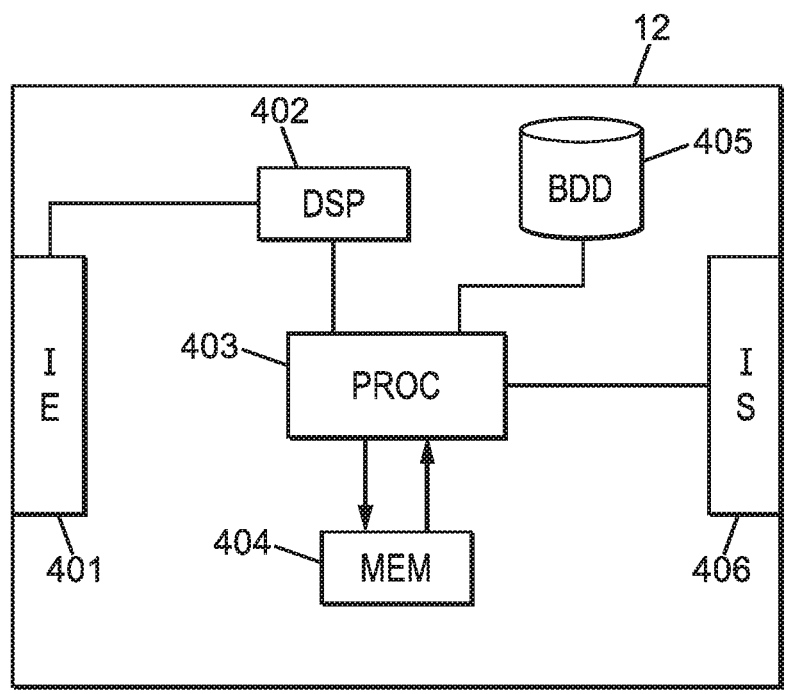
FIG. 4 illustrates the structure of a data processing device according to one embodiment of the invention.

The duration D can advantageously be chosen on the basis of the curve 301 presented in FIG. 3. For example, D can be the duration for which an analysis result can be obtained for at least k % of the data streams, for example 90%. D is thus calculated in such a way that the number $N_1$ illustrated in FIG. 3 represents a tenth of the total number N of data streams considered.

This makes it possible to ensure a fixed latency, of relatively small value, while reducing the risk of transferring a data packet belonging to a prohibited stream (since the analysis result will have been obtained on completion of the duration D in 90% of cases).

FIG. 3 represents a processing device 12 according to one embodiment of the invention.

The processing device 12 comprises a random-access memory 404 and a processor 403 for storing instructions allowing the implementation of the steps of the method described hereinabove with reference to FIG. 2. The filtering device 12 also comprises a database 405 for storing data that are intended to be preserved after the application of the method, especially data for marking data streams, as authorized data streams or prohibited data streams or as data streams differentiated by QoS policies to be applied, but also rules making it possible to deduce a stream categorization on the basis of an analysis result. The processing device 12 furthermore comprises an input interface 401 intended to receive the data packets of data streams exchanged via the access point 11, and to receive the results of analysis of the stream analyzer 13. As a variant, distinct input interfaces may be provided, one being dedicated to the interception of the data packets exchanged via the access point, and the other being dedicated to the reception of the results of analysis of the stream analyzer 13.

The processing device 12 comprises an output interface 406 able to transmit on the one hand copies of data packets (or references to the data packets) to the stream analyzer 13 and on the other hand to transfer the data packets to the client 10 or to the network 14. Just as for the input interface 401, distinct output interfaces may be provided.

Of course, the present invention is not limited to the embodiment described hereinabove by way of example; it extends to other variants.

The invention claimed is:

1. A method for processing a data stream exchanged between a client (10) and an entity (15;16) via a telecommunications network (14), the data stream comprising a set of data packets, the processing method comprising the following steps:
   on interception (201) of a data packet of the set of data packets, said data stream comprising a source and a recipient, said client being the source or the recipient of the data stream, copying (204) said data packet or generating a reference to said data packet, and transferring (205) the data packet to the recipient;
   transmitting said copy or reference to a stream analyzer able to analyze the data stream;
   receiving (206) a result of analysis of the data stream from the stream analyzer;
   processing (207; 208) the data stream on the basis of the analysis result received;
said method furthermore comprising a time delay step (209) of a predetermined duration D subsequent to the copying of the data packet or to the generating of the reference, and in which the data packet is transferred to the recipient on expiry of the time delay, only:
   if the stream analysis result has been received from the stream analyzer and the data stream is authorized; or
   if the stream analysis result has not yet been received from the stream analyzer.

2. The method as claimed in claim 1, in which processing the data stream can comprise:
   applying a quality-of-service policy depending on the analysis result received; or
   authorizing or prohibiting the data stream on the basis of the analysis result received.

3. The method as claimed in claim 1, in which the predetermined duration D is determined in, a statistical manner in such a way that, for a set N of data streams, at least one predetermined fraction k of the N data streams is analyzable by the stream analyzer in an analysis duration of less than D.

4. The method of claim 2, in which the step of processing the stream of to give comprises the authorization or the prohibition of the comprises the following steps:
   storing in a database (405) a marking of the data stream, the marking indicating whether the stream is authorized or prohibited;
and in which, on each interception of a data packet, the method furthermore comprises:
   identifying (202) the data stream corresponding to the packet received;
   transferring the data packet to the recipient if the data packet corresponds to an authorized stream;
   blocking the data packet if the data packet corresponds to a prohibited stream.

5. A computer program product comprising instructions for the implementation of the method of claim 1, when this program is executed by a processor.

6. A device for processing a data stream exchanged between a client and an entity (15;16) via a telecommunications network (14), the data stream comprising a set of data packets, the processing device (12) comprising:
- an input interface (401) for intercepting a data packet belonging to a data stream;
- an output interface (406);
- a processor (403) configured to, on interception of a data packet of the set of data packets, said data stream comprising a source and a recipient, said client being the source or the recipient of the data stream, copy said data packet or generate a reference to said data packet, and to transfer the data packet to the recipient via the output interface;
- in which the output interface is furthermore designed to transmit said copy or reference to a stream analyzer able to analyze the data stream;
- in which the input interface is furthermore designed to receive a result of analysis of the data stream from the stream analyzer;
- in which the processor is furthermore designed to process the data stream on the basis of the analysis result received;
- in which the processor is able to effect a time delay of a predetermined duration D subsequent to the copying of the data packet or to the generating of the reference, and to transfer the data packet to the recipient on expiry of the time delay, only:
- if the stream analysis result has been received from the stream analyzer and the data stream is authorized; or
- if the stream analysis result has not yet been received from the stream analyzer.

7. A stream processing system comprising a processing device (12) as claimed in claim 6 and a stream analyzer (13) able to, on the basis of one or more data packets of a data stream, obtain a result of analysis of the data stream.

* * * * *